US007709785B2

(12) United States Patent
Jolliffe et al.

(10) Patent No.: US 7,709,785 B2
(45) Date of Patent: May 4, 2010

(54) METHOD AND APPARATUS FOR MASS SELECTIVE AXIAL TRANSPORT USING QUADRUPOLAR DC

(75) Inventors: Charles L. Jolliffe, Schomberg (CA); Frank Londry, Peterborough (CA); Alexandre V. Loboda, North York (CA)

(73) Assignees: MDS Inc., Concord, Ontario (CA); Applied Biosystems (Canada) Limited, Toronto, Ontario (CA)

( * ) Notice: Subject to any disclaimer, the term of this patent is extended or adjusted under 35 U.S.C. 154(b) by 759 days.

(21) Appl. No.: 11/434,814

(22) Filed: May 17, 2006

(65) Prior Publication Data

US 2006/0289744 A1 Dec. 28, 2006

Related U.S. Application Data

(60) Provisional application No. 60/681,947, filed on May 18, 2005, provisional application No. 60/721,072, filed on Sep. 28, 2005.

(51) Int. Cl.
*B01D 59/44* (2006.01)
*H01J 49/00* (2006.01)

(52) U.S. Cl. ....................... 250/282; 250/281; 250/288; 250/292

(58) Field of Classification Search ................. 250/281, 250/282, 288, 292
See application file for complete search history.

(56) References Cited

U.S. PATENT DOCUMENTS

| | | | | |
|---|---|---|---|---|
| 5,847,386 | A * | 12/1998 | Thomson et al. | 250/288 |
| 6,028,308 | A * | 2/2000 | Hager | 250/282 |
| 6,111,250 | A | 8/2000 | Thomson et al. | |
| 6,177,668 | B1 | 1/2001 | Hager | |
| 6,630,662 | B1 | 10/2003 | Loboda | |
| 6,744,043 | B2 | 6/2004 | Loboda | |
| 2004/0011956 | A1 | 1/2004 | Londry et al. | |

OTHER PUBLICATIONS

Written Opinion of the International Searching Authority, Sep. 7, 2006, Canadian Intellectual Property Office, Gatineau, Quebec, Canada.
PCT International Search Report, Sep. 7, 2006, Canadian Intellectual Property Office, Gatineau, Quebec, Canada.
F. A. Londry and James W. Hager, "Mass Selective Axial Ion Ejection from a Linear Quadrupole Ion Trap", 2003 American Society for Mass Spectrometry, 14, 1130-1147.

* cited by examiner

*Primary Examiner*—David A Vanore
(74) *Attorney, Agent, or Firm*—Bereskin & Parr LLP/S.E.N.C.R.L., s.r.l.

(57) ABSTRACT

A mass spectrometer system and a method of operating a mass spectrometer are provided. An RF field is produced between the plurality of rods to radially confine the ions in the rod set. The RF field has a resolving DC component field. The resolving DC component field is varied along at least a portion of a length of the rod set to provide a DC axial force acting on the ions.

18 Claims, 6 Drawing Sheets

METHOD AND APPARATUS FOR MASS SELECTIVE AXIAL TRANSPORT USING QUADRUPOLAR DC

CROSS-REFERENCE TO RELATED APPLICATION

This application claims the benefits of U.S. Provisional Application No. 60/681,947 filed May 18, 2005, and U.S. Provisional Application No. 60/721,072 filed Sep. 28, 2005.

FIELD OF THE INVENTION

The present invention relates generally to mass spectrometry, and more particularly relates to a method and apparatus for mass selective axial transport using quadrupolar DC.

BACKGROUND OF THE INVENTION

Many types of mass spectrometers are known, and are widely used for trace analysis to determine the structure of ions. These spectrometers typically separate ions based on the mass-to-charge ratio ("m/z") of the ions. One such mass spectrometer system involves mass-selective axial ejection—see, for example, U.S. Pat. No. 6,177,668 (Hager), issued Jan. 23, 2001. This patent describes a linear ion trap including an elongated rod set in which ions of a selected mass-to-charge ratio are trapped. These trapped ions may be ejected axially in a mass selective way as described by Londry and Hager in "Mass Selective Axial Ejection from a Linear Quadrupole Ion Trap," J Am Soc Mass Spectrom 2003, 14, 1130-1147. In mass selective axial ejection, as well as in other types of mass spectrometry systems, it will sometimes be advantageous to control the axial location of different ions.

SUMMARY OF THE INVENTION

In accordance with an aspect of the present invention, there is provided a method of operating a mass spectrometer having an elongated rod set, the rod set having an entrance end, an exit end, a plurality of rods and a central longitudinal axis. The method comprises: a) admitting ions into the entrance end of the rod set; b) producing an RF field between the plurality of rods to radially confine the ions in the rod set, the RF field having a resolving DC component field; and, c) varying the resolving DC component field along at least a portion of a length of the rod set to provide a DC axial force acting on the ions.

In accordance with a second aspect of the present invention, there is provided a mass spectrometer system comprising: (a) an ion source; (b) a rod set, the rod set having a plurality of rods extending along a longitudinal axis, an entrance end for admitting ions from the ion source, and an exit end for ejecting ions traversing the longitudinal axis of the rod set; and, (c) a voltage supply module for producing an RF field between the plurality of rods of the rod set, the RF field having a resolving DC component field. The voltage supply module is coupled to the rod set to vary the resolving DC component field along at least a portion of a length of the rod set to provide a DC axial force acting on the ions.

BRIEF DESCRIPTION OF THE DRAWINGS

A detailed description of preferred aspects of the present invention is provided herein below with reference to the following drawings, in which.

DETAILED DESCRIPTION OF PREFERRED ASPECTS OF THE PRESENT INVENTION

Figure 1:
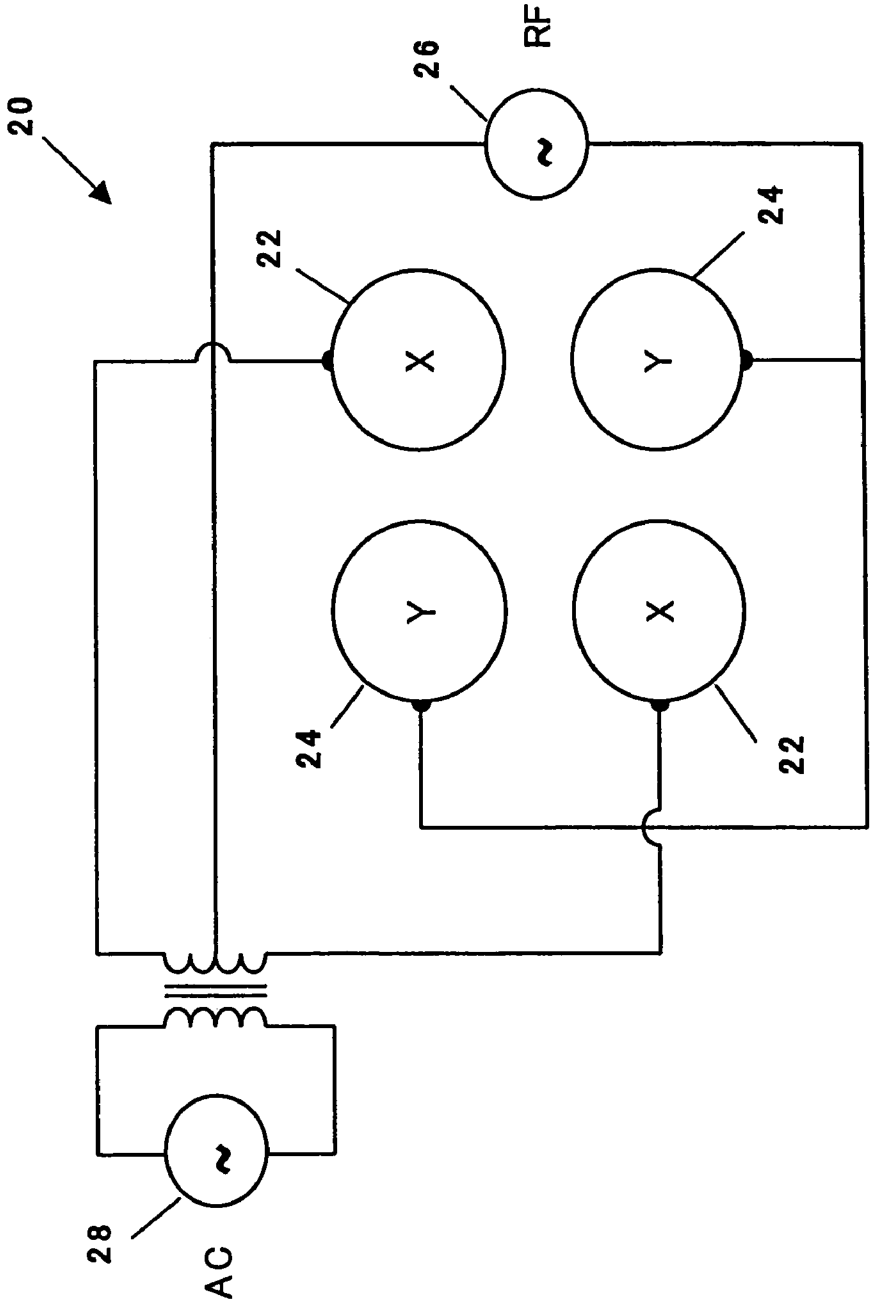
FIG. 1 (PRIOR ART)
FIG. 1, in a schematic view, illustrates a quadrupole rod set in which a dipolar auxiliary signal is provided to one of the rod pairs.

Referring to FIG. 1, there is illustrated in a schematic view a quadrupole rod set 20 in which a dipolar auxiliary AC signal is provided to one of the rod pairs. Specifically, the quadrupole rod set 20 comprises a pair of X-rods 22 and a pair of Y-rods 24 with RF voltage applied to them (in a known manner) by RF voltage source 26 to provide radial confinement of ions. The exit end of the quadrupole rod set 20 can be blocked by supplying an appropriate voltage to an exit electrode at the exit end.

In addition to the RF voltage that is applied to all of the rods by RF voltage source 26, an auxiliary dipolar signal is provided to X-rods 22, but not to Y-rods 24, by AC voltage source 28 (in a known manner).

According to aspects of the invention, the RF voltage supplied to X-rods 22 and Y-rods 24 includes a quadrupolar or resolving DC component. The quadrupolar DC component applied to the X-rods 22 is opposite in polarity to the quadrupolar DC component applied to the Y-rods 24. As will be described in more detail below in connection with FIGS. 2 and 3, the quadrupolar DC applied to the X-rods 22 and Y-rods 24 is applied in such a way that its magnitude changes along the lengths of the rods. According to one aspect of the present invention, illustrated in FIG. 2 and described below, the quadrupolar DC profile along the rod set diminishes linearly from a maximum at the entrance end of the rod set to a minimum at the exit end of the rod set. According to another aspect of the invention described below in connection with FIG. 3, the quadrupolar DC profile along the rod set diminishes from a maximum near to the entrance end of the rod set to a minimum near the exit end of the rod set. In the description that follows, the charge carried by the ions is assumed to be positive, the quadrupolar resolving DC applied to the X-rods is assumed to be positive, and the quadrupolar resolving DC applied to the Y-rods is assumed to be negative. More generally, the quadrupolar resolving DC applied to the X-rods is assumed to be of the same polarity as the ions.

The derived axial force resulting from the variation in the DC quadrupolar voltage applied to the rods can be calculated, for the two-dimensional mid-section of a linear quadrupole rod set by considering the contribution to the potential of the resolving quadrupolar DC. In the central portion of a linear ion trap where end effects are negligible, the two-dimensional quadrupole potential can be written as $$\ddot{O}_{2D} = \varphi_0 \frac{x^2 - y^2}{r_0^2} \quad (1)$$

where $2r_0$ is the shortest distance between opposing rods and $\phi_0$ is the electric potential, measured with respect to ground, applied with opposite polarity to each of the two poles. Traditionally, $\phi_0$ has been written as a linear combination of DC and RF components as $$\phi_0 = U—V \cos\Omega t \quad (2)$$

where Ù is the angular frequency of the RF drive.

In this instance, we may disregard the alternating RF term and write the DC contribution as a linear function of the axial coordinate z, measured from the axial position at which the quadrupolar DC is a maximum, as $$\ddot{O}_{DC} = U_0\left(1 - \frac{z}{z_0}\right)\frac{x^2 - y^2}{r_0^2} \quad (3)$$

where, $U_0$ is the level of the resolving DC applied to the entrance end of the rods and $z_0$ is the axial dimension over which the quadrupolar DC is applied. The axial component of the electric field can be obtained by differentiating Eq. 3 with respect to the axial coordinate z to yield the following:

$$E_z = \frac{U_0}{z_0 r_0^2}(x^2 - y^2) \quad (4)$$

Consideration of Eq. 4 yields three significant features. First, the force is axially uniform. Second, axial field strength depends quadratically on radial displacement. Finally, the sign of the derived axial force is positive in the x-z plane but negative in the y-z plane.

To facilitate discussion, assume that the ions are positive and the polarity of the quadrupole DC applied to the X-pole rods is also positive. The discussion would apply equally well if the polarity of the ions was negative and the polarity of the quadrupolar DC applied to the X-pole rods was negative. One consequence of this arrangement is that thermal ions tend to congregate near the entrance end of the rod set, or where the derived axial force first begins. This occurs because the quadrupolar resolving DC is positive on the X-pole. Repelled by the positive potential on the X-rods, and attracted by the negative potential on the Y-rods, positive ions will tend to have somewhat higher radial amplitudes in the y-z plane than in the x-z plane. Thus, on average, the net field experienced by thermal ions is slightly negative, resulting in a higher ion density towards the entrance end of the rod set. As the derived axial force scales quadratically with radial amplitude, the net force felt by thermal ions is very weak: sufficient to reduce dramatically the amount of charge near the exit where it would perturb mass-selective axial ejection, but not so strong that ions would not be distributed over a significant length of the rod assembly.

The foregoing description deals with positive ions. In general, the dipolar auxiliary voltage signal should be provided to the rod pair that receives the quadrupolar resolving DC of the same polarity as the ions in the rod array. Thus, in the case where a quadrupolar rod set contains negative ions, and the quadrupolar resolving DC of negative polarity is provided to the X-rods, then the dipolar auxiliary voltage signal should be provided to the X-rods, as before.

Figure 2:
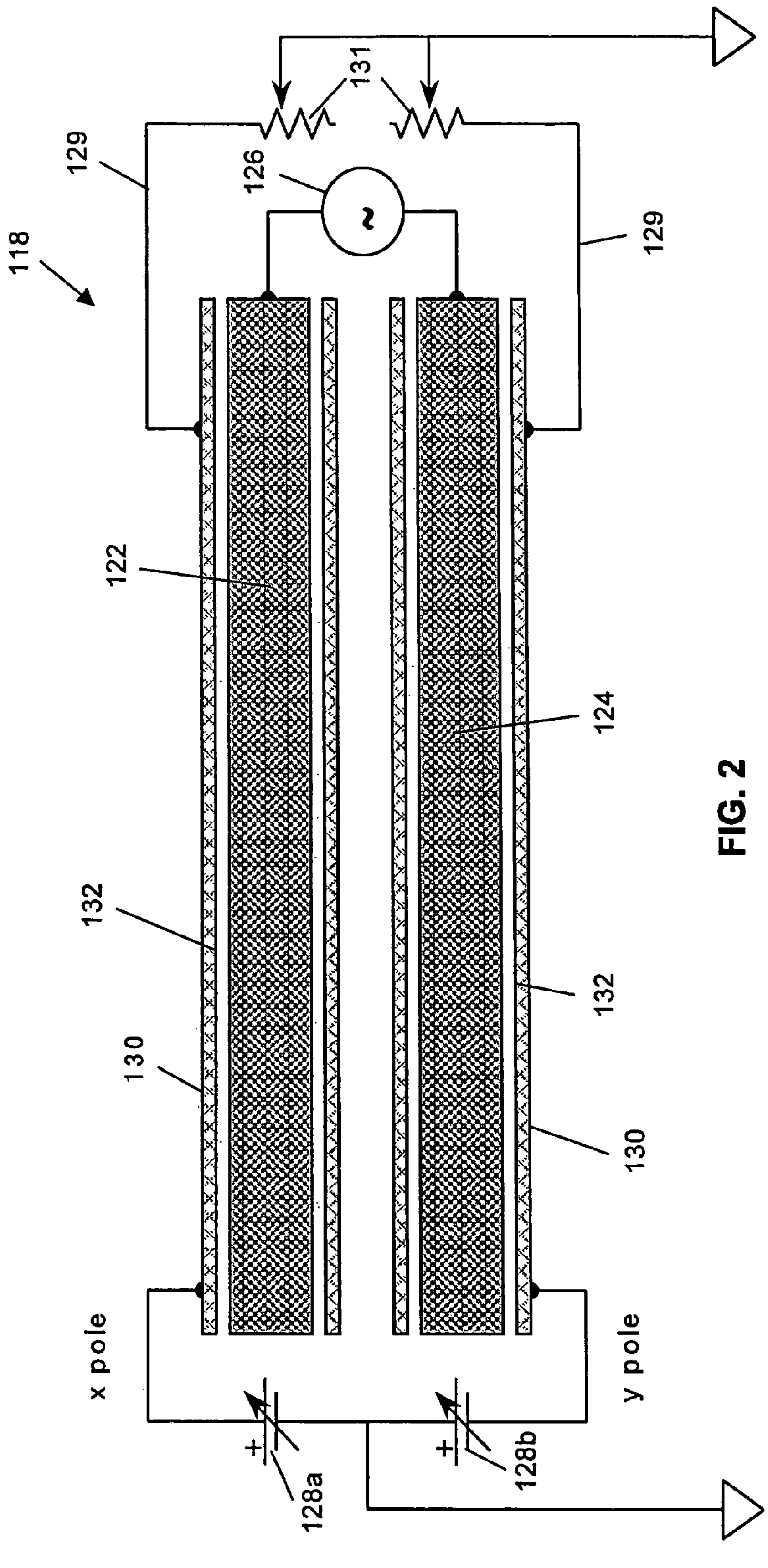
FIG. 2, in a schematic view, illustrates an ion guide in accordance with a first aspect of the present invention.

Referring to FIG. 2, there is illustrated in a schematic diagram, an ion guide 118 in accordance with a first aspect of the present invention. For brevity, the description of FIG. 1 will not be repeated with respect to FIG. 2, Instead, and for clarity, elements analogous to those described above in connection with FIG. 1 will be designated using the same reference numerals, plus 100.

As shown in FIG. 2, both the X-rods 122 and Y-rods 124 are coated with a high-dielectric insulating layer 132. Preferably, this insulating layer 132 is capable of isolating a minimum of 200 V DC. This insulating layer 132 is, in turn, coated with a thin resistive coating 130. Preferably, this thin resistive film 130 offers an end-to-end resistance on each rod of 10 to 20 MΩ. Preferably, both the resistive coating 130 and insulating layer 132 should be as thin as possible.

As shown in FIG. 2, quadrupolar DC is applied at one end of the X-rods 122 and Y-rods 124 by variable DC quadrupolar voltage sources 128*a* and 128*b* respectively. The DC quadrupolar voltage provided by variable DC quadrupolar voltage sources 128*a* and 128*b* are opposite in polarity.

Rod sets as described in FIG. 2 may be constructed in any number of different ways. For example, a stainless steel rod 0.003" smaller in radius than the desired final radius may be coated with a layer of alumina approximately 0.010" thick. Subsequently, the rod may be machined to the desired radius, resulting in a layer of alumina of thickness 0.003". The alumina-coated rod would then be masked, and the resistive coating 130 applied. As resistive coating 130 can be very thin, perhaps having a thickness of 10 microns or less, the thickness of resistive coating 130 need not significantly affect the radial dimension of the rods. Finally, metal bands may be applied to each end of the rods 122 and 124 to facilitate good ohmic contact with lead wires from variable DC quadrupolar voltage sources 128*a* and 128*b* at one end, and with lead wires 129 at the other end.

Alternatively, and more simply, ordinary stainless steel rods 122 and 124, already machined to normal specifications, may be coated with a high-dielectric polymer (the resistive coating 130), which is sufficiently resistive such that a 10 micron layer suffices to withstand 200 V DC. Subsequently, ions are implanted in the polymer layer to a depth of only a few microns to create the resistive coating 130. As described above, metal bands at the ends insure good ohmic contact between the resistive coating 130 and, at one end, lead wires from variable DC quadrupolar voltage sources 128*a* and 128*b*, and, at the other end, lead wires 129.

A third method of making the rod set of FIG. 2 involves chemical vapour deposition (CVD) of an insulating layer from [2,2]-para-cyclophane paralyne to an average depth of 23 μm, followed by CVD of a resistive coating of hydrogenated amorphous silicon (a-Si:H) film of estimated thickness ~0.5 μm.

Under normal RF/DC operation, quadrupolar, resolving DC is applied to both ends of the resistive coating 130, to minimize variation in the quadrupolar DC over the length of the rods. However, in aspects of the present invention, the quadrupolar resolving DC, $U_{DC} < 0.01 \times |V_{RF}|$, is applied to the resistive coating 130, via the circumferential metal bands or other suitable means, at one end, preferably the entrance-end, of the rod set 120 only. At the exit end, as shown in FIG. 2, rods 122 and Y-rods 124, which are of opposite polarity in terms of the quadrupolar DC applied to them, are connected to each other, by lead wires 129. Lead wires 129 are connected to one another through variable resistors 131 that have sufficient resistance to compensate for variations in the end-to-end resistances of each rod so that the quadrupolar DC can be nulled, or reduced to some suitable minimum, at the exit-end of the ion guide 118.

Figure 3:
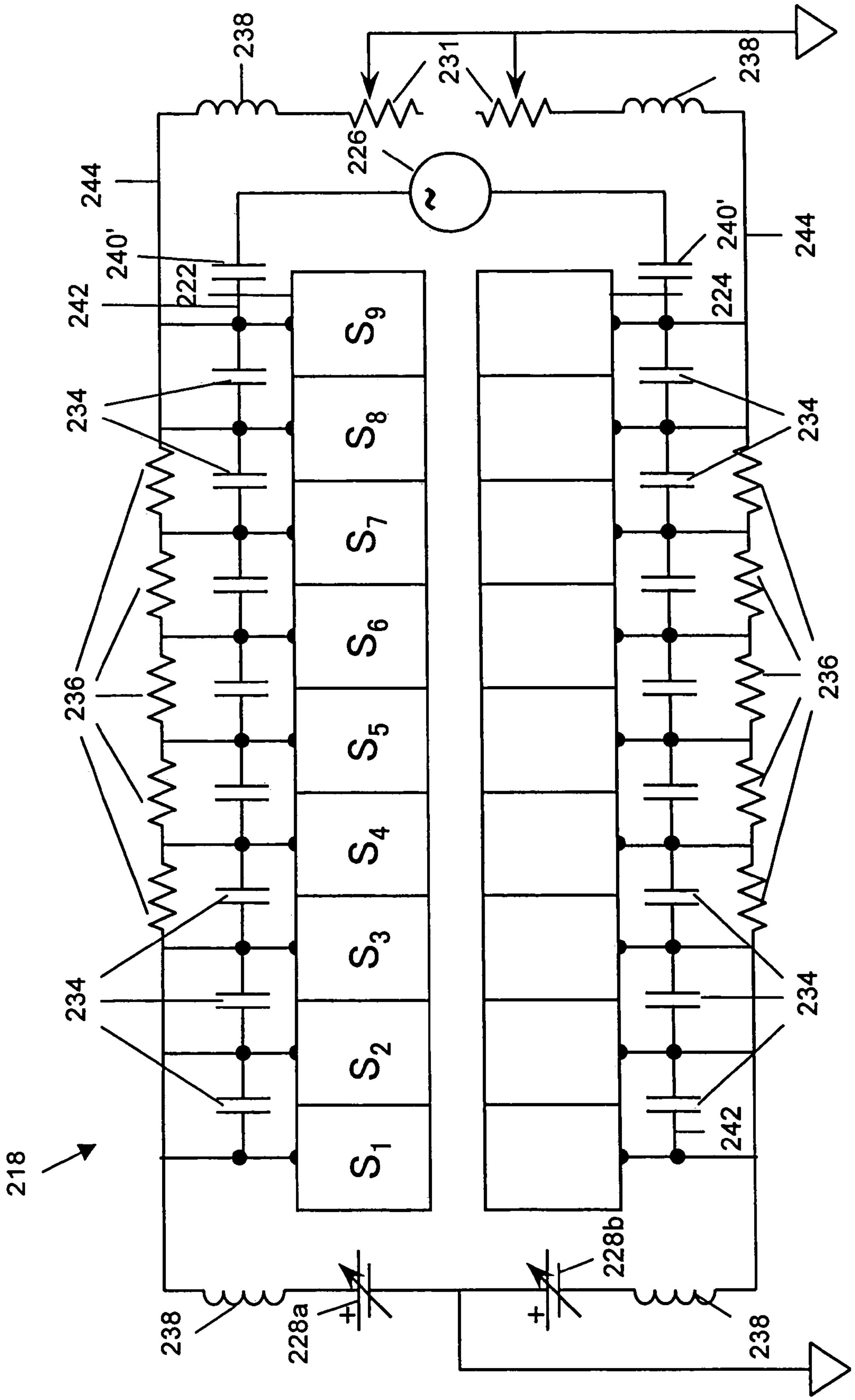
FIG. 3, in a schematic view, illustrates an ion guide in accordance with a second aspect of the present invention.

Referring to FIG. 3, there is illustrated in a schematic diagram, an ion guide 218 in accordance with a second aspect of the present invention. For brevity, the description of FIG. 1 will not be repeated with respect to FIG. 3. Instead, and for clarity, elements analogous to those described above in connection with FIG. 1 are designated using the same reference numerals, plus 200.

As shown in FIG. 3, both the X-rods 222 and the Y-rods 224 are divided into segments, numbered $S_1$ to $S_9$ (it will, of course, be appreciated by those of skill in the art that the rods may be divided into a different number of segments). Variable resolving DC voltage sources 228*a* and 228*b* provide quadrupole resolving DC voltages of opposite polarity to X-rods 222 and Y-rods 224.

As shown in FIG. 3, each of the segments of the X-rods 222 and Y-rods 224 are coupled along an RF path 242 by capacitive dividers 234, and the RF voltage supplied by RF voltage source 226 is supplied to the individual segments via these capacitive dividers 234. The capacitance of these capacitive dividers 234 define the RF voltage profile along the length of the ion guide 218. Ideally, these would be chosen sufficiently small that the RF voltage will not drop appreciably over the length of the rods. However, in some applications, it may be desirable to vary the magnitude of quadrupolar RF along the length of the rods by this means.

In the embodiment of FIG. 3, resolving quadrupolar DC is provided to all segments, but the low resistance DC connections between segments $S_1$ and $S_2$, and between segments $S_2$ and $S_3$, of X-rods 222 and Y-rods 224, provide a means of maintaining a constant quadrupolar DC level across segments $S_1$, $S_2$, and $S_3$. Similarly, the low resistance DC connections between segments $S_8$ and $S_9$ of X-rods 222 and Y-rods 224, provide a means of maintaining a constant quadrupolar DC level across segments $S_8$ and $S_9$ of X-rods 222 and Y-rods 224. Consequently, the quadrupolar resolving DC provided by DC voltage sources 228*a* and 228*b* via DC path 244 to X-rods 222 and Y-rods 224 will remain constant between segments $S_1$, $S_2$ and $S_3$, vary between segments $S_3$ and $S_4$, $S_4$ and $S_5$, $S_5$ and $S_6$, $S_6$ and $S_7$, and $S_7$ and $S_8$, and remain constant between segments $S_8$ and $S_9$. In this way, the values of the resistances, which make DC electrical connections between adjacent segments along DC path 244, define DC voltage profile along the ion guide 218.

In the embodiment of FIG. 3, unlike the embodiment of FIG. 2, the derived axial force is negligible between segments $S_1$ and $S_2$, between segments $S_2$ and $S_3$, and between segments $S_8$ and $S_9$. That is, the quadrupolar resolving DC field, from which the derived axial force is derived, remains constant until it begins to diminish between segments $S_3$ and $S_4$. Consequently, the derived axial force from quadrupolar resolving DC will begin in the vicinity of segment $S_3$.

Similarly, the derived axial force is negligible at segment $S_9$.

Quadrupolar resolving DC path 244 is separate from RF path 242; however, as both of these paths are connected to the rod set, they must be electrically isolated from each other. For this reason, blocking inductors 238 are provided along quadrupolar resolving DC path 244 to isolate DC voltage sources 228*a* and 228*b*, as well as variable resistors 231, from RF current received via X-rods 222 and Y-rods 224. Blocking capacitors 240 serve to isolate RF voltage source 226 from the quadrupole DC provided to segment $S_9$.

Mass-Selective Axial Transport

Figure 4:
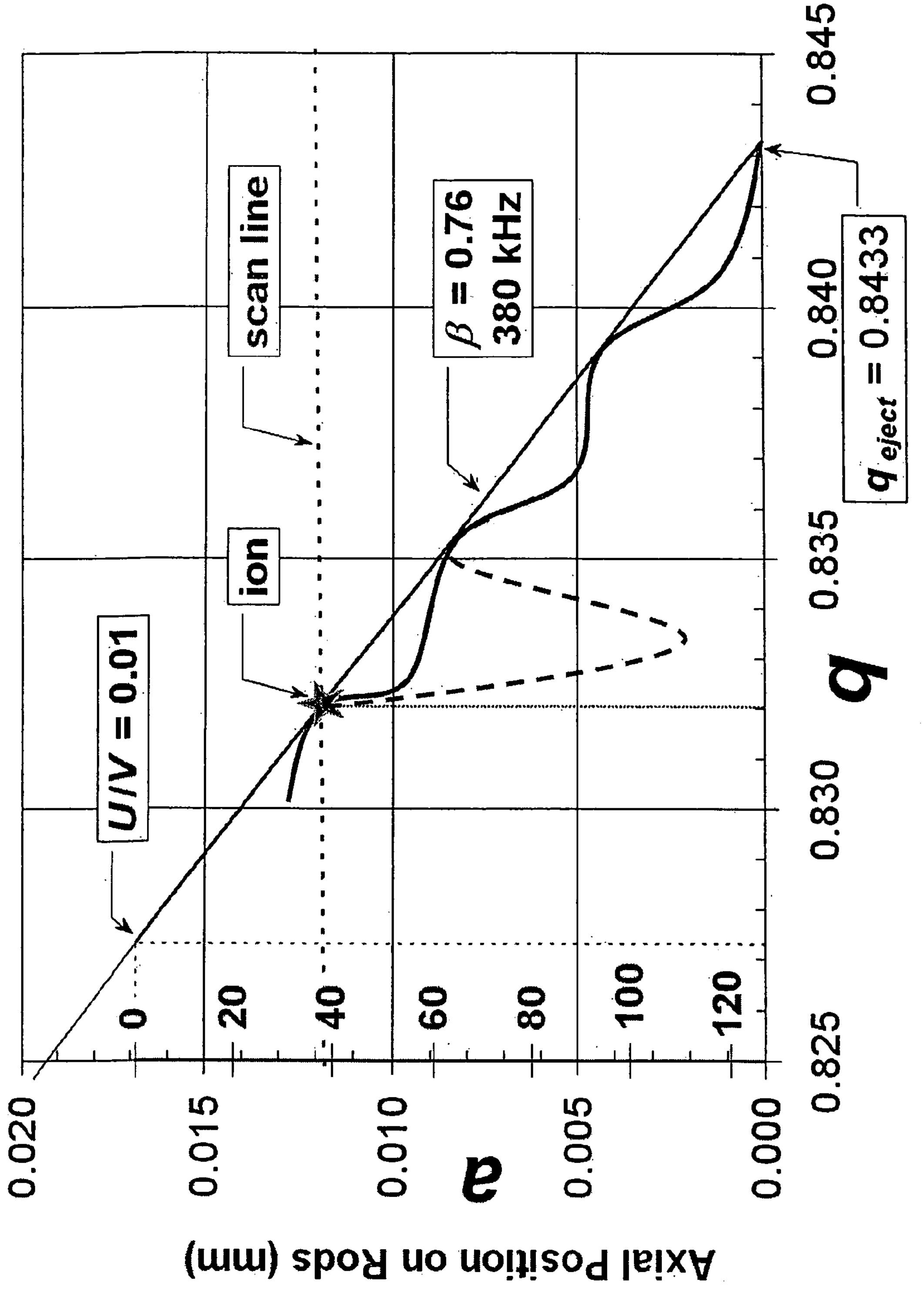
FIG. 4 is a stability diagram illustrating how a derived axial field of the ion guides of FIG. 2 or FIG. 3 can improve the efficiency of mass-selective axial ejection.

The operation of the ion guides 118 and 218 of FIGS. 2 and 3 respectively for mass-selective axial transport, in which ions are introduced to the ion guides from an ion source (not shown), and then accelerated axially by the axial gradient of the quadrupolar DC potential, will be explained with reference to FIG. 4. FIG. 4 is a stability diagram, which illustrates how the derived axial field can be used to improve the efficiency of mass-selective axial ejection wherein the RF amplitude is ramped at a constant rate to bring ions of successively higher mass into resonance with the low-amplitude, dipolar, auxiliary signal provided as described above in connection with FIG. 1. In addition, it is important that the dipolar auxiliary AC signal be applied between the rods of the pole on which the polarity of the quadrupolar DC matches the polarity of the ion. In the discussion that follows, the polarity of the ion is positive and the positive pole of the quadrupolar resolving DC and the dipolar auxiliary signal are both applied to the X-rods.

In the stability diagram of FIG. 4, the U/V ratio is 0.01 at z=0.0, and drops to zero at z=127 mm. Consequently, the slope of the scan line is also a function of axial position. This relationship has been portrayed in FIG. 4 by superposing the axial scale on the ordinate, indicating that the Mathieu parameter a is a function of axial position, but q is not. For any specific mass, q increases linearly in time as the RF amplitude is ramped. The frequency of the auxiliary signal is 380 kHz, corresponding to the iso-β line on which β=0.76 in a 1.0 MHz system. This corresponds to $q_{eject}$=0.8433 for mass-selective axial ejection and both of these features are represented in FIG. 4.

Now consider the ion in FIG. 4 located on the scan line at (a, q)=(0.0118, 0.8320), z=38 mm, whose path through stability-space, from higher to lower a, is shown with a solid line. By virtue of increasing RF amplitude, this ion has moved along the scan line until it comes into resonance with the auxiliary signal at the intersection of the scan line with β=0.76. Recall that the ion is always on the scan line, so that the slope of the scan line, and its intersection with the line β=0.76, changes with the axial position of the ion. In consequence of its increased X amplitude, the ion experiences an increased positive axial force and is accelerated towards the exit lens. As a result, its a-value is reduced and the ion comes off resonance. Whether its radial motion is damped through a collision with the low-pressure buffer gas, or the change in phase relationship between the auxiliary signal and the ion's secular motion, its acceleration towards the exit-lens slows. Alternatively, the ion may be reflected by the exit-lens potential; in this case, as indicated by the dashed line, the ion's path in the stability-space could approach the q-axis, if it moves sufficiently close to the exit end before being reflected back to higher a-values. In either case, in response to linearly increasing q, the ion's position on its scan line intersects with β=0.76 once again at lower a (and higher q), and the ion suffers additional resonant excitation. This cycle, or variations thereof, repeat until the ion either is ejected axially, or is lost on the rods, where the line β=0.76 intersects the q axis. By this means, ions of successfully higher mass can be combed toward the exit end of the rod set just prior to mass-selective axial ejection.

Simulation Results

The response of ions to the above-described derived axial force was studied using three-dimensional computer simulations of ion trajectories in a quadrupole linear ion trap (LIT). To that end, specific models were developed in which the quadrupolar DC applied to the rods varied with axial position.

In the two-dimensional midsection of the LIT, the derived axial force was calculated analytically from two-dimensional numeric potentials. However, in the fringing regions at the ends of the rod set, it was necessary to solve the Laplace equation for electrode configurations where the quadrupolar DC voltage varied linearly with axial position on the rods. A few sample results are presented below.

Figure 5:
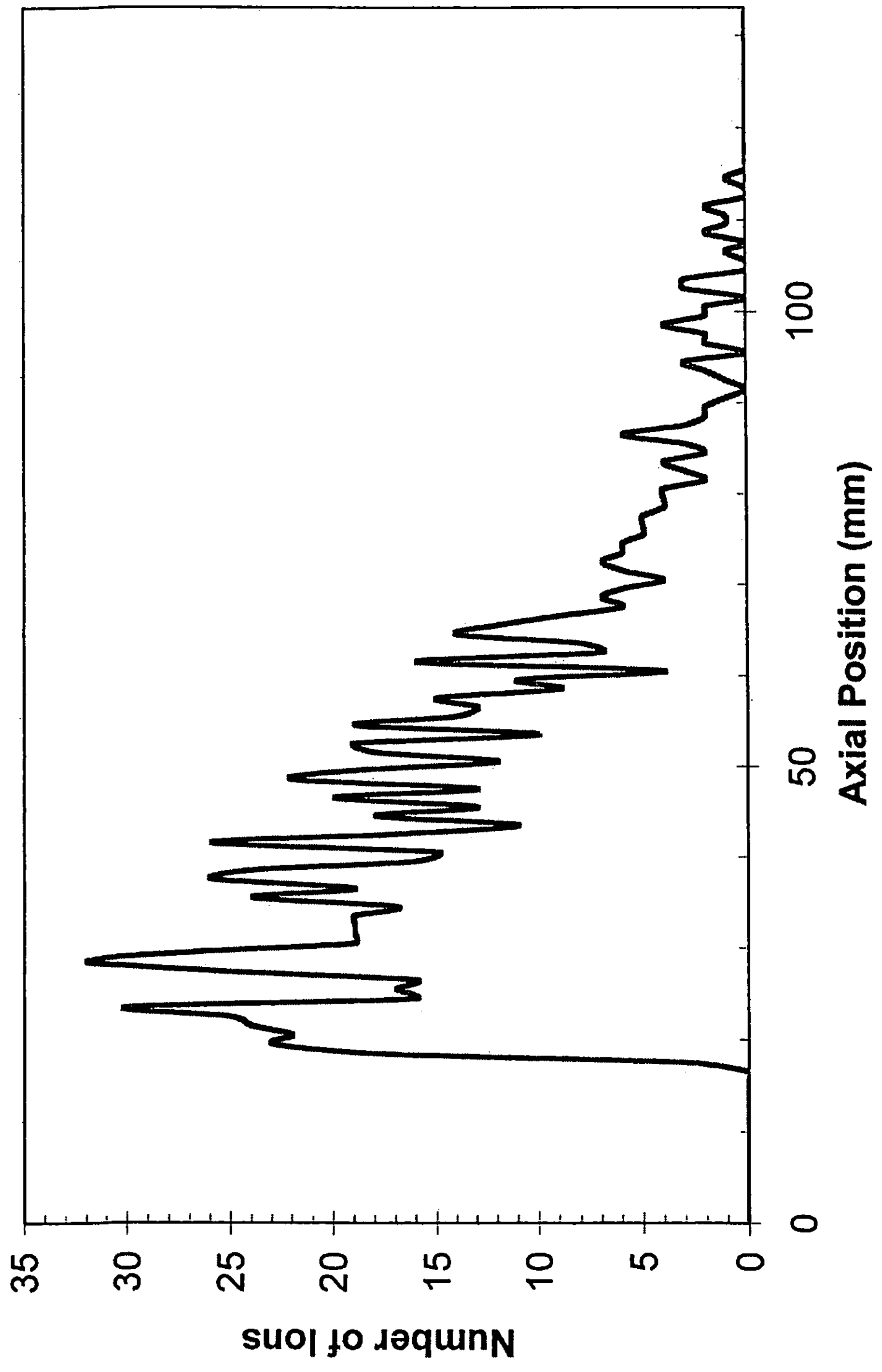
FIG. 5 is a graph illustrating a simulation of axial position of thermalized ions when a resolving DC quadrupolar voltage is applied to a rod set in accordance with aspects of the invention; and, FIG. 6 is a graph illustrating the axial component of a trajectory of an ion when a resolving DC quadrupolar voltage is applied to the rods of a rod set in accordance with aspects of the present invention.

As discussed above, ions tend to congregate near the entrance end of the ion guide in which the derived axial force is provided. Referring to FIG. 5, a graph plots data that illustrates this behavior. Specifically, FIG. 5 shows the axial distribution of 1000 ions that were allowed to thermalize with a buffer gas while the derived axial force was provided. These data were obtained by cooling 1,000 ions of m/z 609 in 6 mtorr $N_2$ for 1 ms at q=0.84 with a $U_0/V$ ratio of 0.01. During the cooling period, +390 V was applied to the lenses of a rod set 127 mm in length. Each lens was located 3 mm distant from the ends of the rods.

Figure 6:
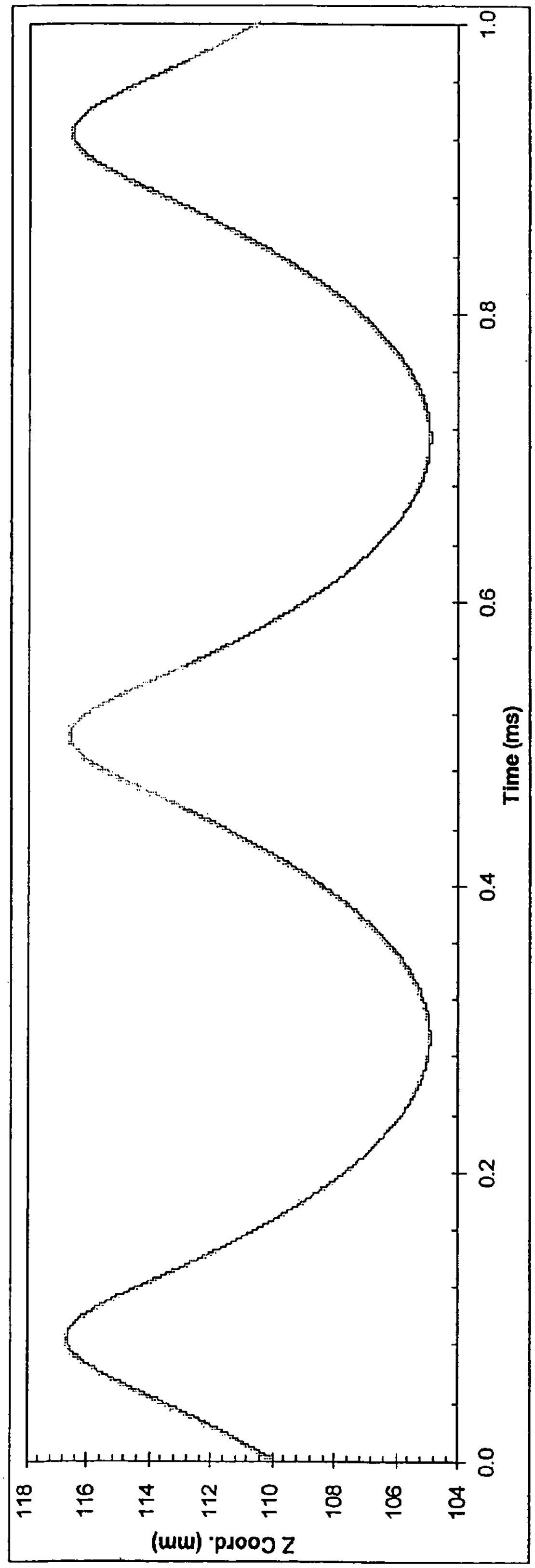

The graph of FIG. 6 shows the axial component of the trajectory of an ion with greater X than Y amplitude as it is reflected alternately by the exit lens and the derived axial force in a collision-free environment.

Other variations and modifications of the invention are possible. For example, other means of providing a variable quadrupolar resolving DC along the rods of an ion guide may be provided. All such modifications or variations are believed to be within the sphere and scope of the invention as defined by the claims appended hereto.

The invention claimed is:

1. A method of operating a mass spectrometer having an elongated rod set, the rod set having an entrance end, an exit end spaced from the entrance end, a plurality of rods and a central longitudinal axis, the method comprising:

a) admitting ions into the entrance end of the rod set;

b) producing an RF field between the plurality of rods to radially confine the ions in the rod set, the RF field having a resolving DC component field; and, c) varying the resolving DC component field along at least a portion of a length of the rod set to provide a DC axial force acting on the ions, wherein at any point along the portion of the length of the rod set, the DC axial force acting on the ions increases with radial displacement of the ions from the central longitudinal axis in a first selected radial direction, such that at that point the DC axial force:

i) moves the ions towards the exit end when displacement of the ions from the central longitudinal axis is in the first selected radial direction; and ii) does not move the ions toward the exit end when displacement of the ions from the central longitudinal axis is in at least one other radial direction different from the first selected radial direction.

2. The method as defined in claim 1 wherein an RF amplitude of the RF field is substantially constant along the length of the rod set.

3. The method as defined in claim 1 further comprising d) selecting a first mass range for the ions;

e) moving a first group of ions within the first mass range toward the exit end of the rod set by increasing the DC axial force acting on the first group of ions by displacing the first group of ions from the central longitudinal axis in the first selected radial direction;

f) confining a second group of ions within the rod set and spaced from the exit end, the second group of ions being within a second mass range disjoint from the first mass range.

4. The method as defined in claim 3 wherein step e) comprises applying a dipolar, auxiliary signal to a rod pair in the rod set having the same polarity as the ions and selecting a RF amplitude of the RF field to bring the first group of ions into resonance with the dipolar, auxiliary signal to move the first group of ions in the first selected radial direction toward the rod pair.

5. The method as defined in claim 4 further comprising g) axially ejecting the first group of ions; and then h) changing the RF amplitude of the RF field to bring the second group of ions into resonance with the dipolar, auxiliary signal to displace the second group of ions from the central longitudinal axis in the first selected radial direction to increase the DC axial force acting on the second group of ions to move the second group of ions toward the exit end of the rod set.

6. The method of operating a mass spectrometer as defined in claim 5 wherein changing the RF amplitude of the RF field comprises ramping the RF amplitude.

7. The method of claim 6 wherein the RF amplitude of the RE field is ramped at a constant rate.

8. The method of operating a mass spectrometer as defined in claim 4 wherein step e) comprises bringing the first group of ions into multiple resonances with the dipolar, auxiliary signal at different displacements along the length of the rod set.

9. The method of operating a mass spectrometer as defined in claim 1 wherein step c) comprises varying a magnitude of the resolving DC component field to be substantially monotonic decreasing from a maximum DC potential to a minimum DC potential.

10. The method of operating a mass spectrometer as defined in claim 1 wherein step c) comprises varying a magnitude of the resolving DC component field linearly from a maximum DC potential to a minimum DC potential such that the DC axial force is constant at any fixed radial position from the longitudinal axis within the resolving DC component field.

11. The method of operating a mass spectrometer as defined in claim 1 further comprising applying a dipolar, auxiliary signal to a rod pair in the rod set having the same polarity as the ions; and, sequentially changing the RF amplitude of the RF field to bring ions of different masses into resonance with the dipolar, auxiliary signal.

12. The method of operating a mass spectrometer as defined in claim 1 wherein step (b) comprises apportioning the resolving DC component field unequally between a pair of rods in the plurality of rods.

13. The method of operating a mass spectrometer as defined in claim 1 wherein step (b) comprises apportioning the resolving DC component field unequally between a pair of rods in the plurality of rods.

14. The method of operating a mass spectrometer as defined in claim 1 wherein the resolving DC component field comprises a positive polarity applied to a first group of rods in the rod set; and, a negative polarity applied to a second group of rods in the rod set.

15. The method as defined in claim 1 wherein at any point along the portion of the length of the rod set, the DC axial force acting on the ions becomes negative with radial displacement of the ions from the central longitudinal axis in a second selected radial direction orthogonal to the first selected radial direction, such that the DC axial force moves the ions toward the entrance end when displacement of the ions from the central longitudinal axis is in the second selected radial direction.

16. A method of operating a mass spectrometer having an elongated rod set, the rod set having an entrance end, an exit end spaced from the entrance end, a plurality of rods and a central longitudinal axis, the method comprising:

a) admitting ions into the entrance end of the rod set;

b) producing an RE field between the plurality of rods to radially confine the ions in the rod set, the RE field having a resolving DC component field;

c) varying the resolving DC component field along at least a portion of a length of the rod set to provide a DC axial force acting on the ions;

d) selecting a first mass range for the ions;

e) moving a first group of ions within the first mass range toward the exit end of the rod set by increasing the DC axial force acting on the first group of ions by displacing the first group of ions from the central longitudinal axis in a first selected radial direction by applying a dipolar, auxiliary signal to a rod pair in the rod set having the same polarity as the ions and selecting a RE amplitude of the RE field to bring the first group of ions into resonance with the dipolar, auxiliary signal to move the first group of ions in the first selected radial direction toward the rod pair;

f) confining a second group of ions within the rod set and spaced from the exit end, the second group of ions being within a second mass range disjoint from the first mass range;

g) axially ejecting the first group of ions; and then h) changing the RF amplitude of the RF field to bring the second group of ions into resonance with the dipolar, auxiliary signal to displace the second group of ions from the central longitudinal axis in the first selected radial direction to increase the DC axial force acting on the second group of ions to move the second group of ions toward the exit end of the rod set.

17. A method of operating a mass spectrometer having an elongated rod set, the rod set having an entrance end, an exit end spaced from the entrance end, a plurality of rods and a central longitudinal axis, the method comprising:

a) admitting ions into the entrance end of the rod set;

b) producing an RF field between the plurality of rods to radially confine the ions in the rod set, the RF field having a resolving DC component field;

c) varying the resolving DC component field along at least a portion of a length of the rod set to provide a DC axial force acting on the ions; and d) applying a dipolar, auxiliary signal to a rod pair in the rod set having the same polarity as the ions.

18. The method of operating a mass spectrometer as defined in claim 17 further comprising e) sequentially changing the RF amplitude of the RF field to bring ions of different masses into resonance with the dipolar, auxiliary signal.

* * * * *